(12) United States Patent
Suh et al.

(10) Patent No.: US 12,498,369 B2
(45) Date of Patent: Dec. 16, 2025

(54) DIAGNOSTIC METHOD FOR SYSTEMIC LUPUS ERYTHEMATOSUS USING SMYD3 AUTOANTIBODY

(71) Applicant: AJOU UNIVERSITY INDUSTRY-ACADEMIC COOPERATION FOUNDATION, Suwon-si (KR)

(72) Inventors: Chang Hee Suh, Seoul (KR); Ho Chul Kang, Suwon-si (KR); Ju Yang Jung, Suwon-si (KR); Wook Young Baek, Hwaseong-si (KR); Jee Min Chung, Taean-gun (KR); Sangwon Lee, Anyang-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1438 days.

(21) Appl. No.: 17/053,950

(22) PCT Filed: May 8, 2019

(86) PCT No.: PCT/KR2019/005479
§ 371 (c)(1),
(2) Date: Nov. 9, 2020

(87) PCT Pub. No.: WO2019/216634
PCT Pub. Date: Nov. 14, 2019

(65) Prior Publication Data
US 2021/0302420 A1 Sep. 30, 2021

(30) Foreign Application Priority Data

May 9, 2018 (KR) ......................... 10-2018-0053277

(51) Int. Cl.
*G01N 33/564* (2006.01)
(52) U.S. Cl.
CPC ....... *G01N 33/564* (2013.01); *G01N 2800/24* (2013.01); *G01N 2800/7095* (2013.01)
(58) Field of Classification Search
None
See application file for complete search history.

(56) References Cited

U.S. PATENT DOCUMENTS

2008/0254482 A1* 10/2008 Mattoon ................. A61P 37/06
435/7.1

FOREIGN PATENT DOCUMENTS

WO WO 2014008426 * 1/2014 ............... C12Q 1/68

* cited by examiner

*Primary Examiner* — Ann Montgomery
(74) *Attorney, Agent, or Firm* — Sughrue Mion, PLLC

(57) ABSTRACT

A method of diagnosing systemic lupus erythematosus using an antigen protein that binds specifically to an SMYD3 autoantibody present in body fluid of a patient with systemic lupus erythematosus. The diagnostic method uses a non-invasive biological sample such as blood, and thus may diagnose systemic lupus erythematosus very conveniently without burdening the patient, unlike conventional methods. In addition, the method has high specificity and sensitivity, and thus may be effectively used for early diagnosis of systemic lupus erythematosus.

4 Claims, 10 Drawing Sheets

Specification includes a Sequence Listing.

```
                        SEQUENCE LISTING

<160> NUMBER OF SEQ ID NOS: 3

<210> SEQ ID NO 1
<211> LENGTH: 428
<212> TYPE: PRT
<213> ORGANISM: Artificial Sequence
<220> FEATURE:
<223> OTHER INFORMATION: SMYD3

<400> SEQUENCE: 1

Met Glu Pro Leu Lys Val Glu Lys Phe Ala Thr Ala Lys Arg Gly Asn
1               5                   10                  15

Gly Leu Arg Ala Val Thr Pro Leu Arg Pro Gly Glu Leu Leu Phe Arg
            20                  25                  30

Ser Asp Pro Leu Ala Tyr Thr Val Cys Lys Gly Ser Arg Gly Val Val
        35                  40                  45

Cys Asp Arg Cys Leu Leu Gly Lys Glu Lys Leu Met Arg Cys Ser Gln
    50                  55                  60

Cys Arg Val Ala Lys Tyr Cys Ser Ala Lys Cys Gln Lys Lys Ala Trp
65                  70                  75                  80

Pro Asp His Lys Arg Glu Cys Lys Cys Leu Lys Ser Cys Lys Pro Arg
                85                  90                  95

Tyr Pro Pro Asp Ser Val Arg Leu Leu Gly Arg Val Val Phe Lys Leu
            100                 105                 110

Met Asp Gly Ala Pro Ser Glu Ser Glu Lys Leu Tyr Ser Phe Tyr Asp
        115                 120                 125

Leu Glu Ser Asn Ile Asn Lys Leu Thr Glu Asp Lys Lys Glu Gly Leu
    130                 135                 140

Arg Gln Leu Val Met Thr Phe Gln His Phe Met Arg Glu Glu Ile Gln
145                 150                 155                 160

Asp Ala Ser Gln Leu Pro Pro Ala Phe Asp Leu Phe Glu Ala Phe Ala
                165                 170                 175

Lys Val Ile Cys Asn Ser Phe Thr Ile Cys Asn Ala Glu Met Gln Glu
            180                 185                 190

Val Gly Val Gly Leu Tyr Pro Ser Ile Ser Leu Leu Asn His Ser Cys
        195                 200                 205

Asp Pro Asn Cys Ser Ile Val Phe Asn Gly Pro His Leu Leu Leu Arg
    210                 215                 220

Ala Val Arg Asp Ile Glu Val Gly Glu Glu Leu Thr Ile Cys Tyr Leu
225                 230                 235                 240

Asp Met Leu Met Thr Ser Glu Glu Arg Arg Lys Gln Leu Arg Asp Gln
                245                 250                 255

Tyr Cys Phe Glu Cys Asp Cys Phe Arg Cys Gln Thr Gln Asp Lys Asp
            260                 265                 270

Ala Asp Met Leu Thr Gly Asp Glu Gln Val Trp Lys Glu Val Gln Glu
        275                 280                 285

Ser Leu Lys Lys Ile Glu Glu Leu Lys Ala His Trp Lys Trp Glu Gln
    290                 295                 300

Val Leu Ala Met Cys Gln Ala Ile Ile Ser Ser Asn Ser Glu Arg Leu
305                 310                 315                 320

Pro Asp Ile Asn Ile Tyr Gln Leu Lys Val Leu Asp Cys Ala Met Asp
                325                 330                 335
```

```
Ala Cys Ile Asn Leu Gly Leu Leu Glu Glu Ala Leu Phe Tyr Gly Thr
            340             345                 350

Arg Thr Met Glu Pro Tyr Arg Ile Phe Phe Pro Gly Ser His Pro Val
        355                 360             365

Arg Gly Val Gln Val Met Lys Val Gly Lys Leu Gln Leu His Gln Gly
    370             375             380

Met Phe Pro Gln Ala Met Lys Asn Leu Arg Leu Ala Phe Asp Ile Met
385             390             395                 400

Arg Val Thr His Gly Arg Glu His Ser Leu Ile Glu Asp Leu Ile Leu
            405             410                 415

Leu Leu Glu Glu Cys Asp Ala Asn Ile Arg Ala Ser
            420             425

<210> SEQ ID NO 2
<211> LENGTH: 27
<212> TYPE: DNA
<213> ORGANISM: Artificial Sequence
<220> FEATURE:
<223> OTHER INFORMATION: SMYD3 WT F

<400> SEQUENCE: 2
atggagccgc tgaaggtgga aaagttc                                              27

<210> SEQ ID NO 3
<211> LENGTH: 27
<212> TYPE: DNA
<213> ORGANISM: Artificial Sequence
<220> FEATURE:
<223> OTHER INFORMATION: SMYD3 WT R

<400> SEQUENCE: 3
ctaggatgct ctgatgttgg cgtcgca                                              27
```

DIAGNOSTIC METHOD FOR SYSTEMIC LUPUS ERYTHEMATOSUS USING SMYD3 AUTOANTIBODY

CROSS REFERENCE TO RELATED APPLICATIONS

This application is a National Stage of International Application No. PCT/KR2019/005479 filed on May 8, 2019, claiming priority based on Korean Patent Application No. 10-2018-0053277 filed on May 9, 2018.

TECHNICAL FIELD

The present invention relates to a method of diagnosing systemic lupus erythematosus (SLE) using an SMYD3 (SET and MYND domain-containing protein 3) autoantibody.

BACKGROUND ART

Systemic lupus erythematosus (SLE) is a disease in which an inflammatory response occurs in various tissues of the body due to autoimmunity, and shows various symptoms such as skin rash, photosensitivity, arthritis, oral ulcers, nephritis, hemocytopenia, vasculitis, and serositis, depending on the affected tissue.

It is known that systemic lupus erythematosus occurs in people with a genetic predisposition thereto due to specific viral infections or environmental exposure such as ultraviolet rays or and smoking (Paula S. et al., Semin Nephrol. 30(2):164-176, 2010; James J. A. et al., Curr. Opin. Rheumatol. 18:462-267, 2006).

For the diagnosis of systemic lupus erythematosus, the 1997 revised diagnostic criteria of the American College of Rheumatology are mainly used. According to these diagnostic criteria, systemic lupus erythematosus is defined as a case satisfying four or more of a total of 11 clinical and immunological criteria including the presence of antinuclear antibodies, and there is no known biomarker specific for systemic lupus erythematosus (Ahn J. K. et al., Korean J. of Med., 78(4):409-415, 2010).

For the treatment of systemic lupus erythematosus, non-specific drugs began to be used in the 1990s, and in recent years, cyclophosphamide has been used as the most powerful drug used in dangerous or severe inflammatory reactions such as nephritis and vasculitis, but sometimes causes serious complications such as infertility, severe infection or hemorrhagic cystitis (M Petri et al., Lupus 13:366-371, 2004). In addition, steroids are used for treatment as the fastest and most effective drugs when systemic lupus erythematosus is activated. However, many patients are diagnosed with lupus at a young age, and the incidence of side effects from continued administration of steroids is increased due to exacerbation upon repeated administration (Susan D. Mathias et al., Health and Quality of Life Outcomes, 15:43, 2017).

There is currently no cure for systemic lupus erythematosus, and systemic lupus erythematosus shows a wide variety of clinical findings and courses depending on the patient. Thus, a treatment regimen appropriate for each patient's disease state should be determined by determining the activity of the disease and accurately identifying the presence or absence of other concomitant diseases such as infectious diseases. Therefore, research on biomarkers for early diagnosis of systemic lupus erythematosus, determination of severity thereof, and drug effectiveness is very important, and if a biomarker of lupus is found through constant basic and clinical research, it will be very helpful in the treatment of lupus.

Accordingly, the present inventors have made extensive efforts to find a biomarker that can simply diagnose systemic lupus erythematosus at an early stage even without using a biopsy or imaging technique. As a result, the present inventors have found that an SMYD3 (SET and MYND domain-containing protein 3) autoantibody is expressed specifically in systemic lupus erythematosus and is present in the blood, thereby completing the present invention.

The above information disclosed in this Background section is only for enhancement of understanding of the background of the present invention. Therefore, it may not contain information that forms a conventional art that is already known in the art to which the present invention pertains.

SUMMARY OF THE INVENTION

An object of the present invention is to simply diagnose systemic lupus erythematosus using an SMYD3 autoantibody present in the blood of a systemic lupus erythematosus patient, and to provide a composition for diagnosing systemic lupus erythematosus comprising an antigen protein that recognizes the SMYD3 autoantibody, and a kit for diagnosing systemic lupus erythematosus comprising the composition.

Another object of the present invention is to provide a method of providing information for diagnosis of systemic lupus erythematosus by detecting the SMYD3 autoantibody in the blood of a systemic lupus erythematosus patient and comparing the level of the SMYD3 autoantibody with a control.

Still another object of the present invention is to provide a method of diagnosing systemic lupus erythematosus by detecting the SMYD3 autoantibody in the blood of a systemic lupus erythematosus patient and comparing the level of the SMYD3 autoantibody with a control.

To achieve the above objects, the present invention provides a composition for diagnosing systemic lupus erythematosus (SLE), the composition comprising an antigen protein that binds specifically to an SMYD3 (SET and MYND domain-containing protein 3) autoantibody.

The present invention also provides a kit for diagnosing systemic lupus erythematosus (SLE), the kit comprising the composition.

The present invention also provides a method for providing information for diagnosis of systemic lupus erythematosus (SLE), the method comprising steps of: (a) detecting an SMYD3 (SET and MYND domain-containing protein 3) autoantibody in a biological sample isolated from a subject; and (b) comparing the level of the detected SMYD3 autoantibody with a control.

The present invention also provides a method for diagnosing systemic lupus erythematosus (SLE), the method comprising steps of: (a) detecting an SMYD3 (SET and MYND domain-containing protein 3) autoantibody in a biological sample isolated from a subject; and (b) comparing the level of the detected SMYD3 autoantibody with a control.

DETAILED DESCRIPTION AND PREFERRED EMBODIMENTS OF THE INVENTION

Unless otherwise defined, all technical and scientific terms used in the present specification have the same meanings as commonly understood by those skilled in the art to which the present invention pertains. In general, the nomenclature used in the present specification is well known and commonly used in the art.

In a specific example of the present invention, attention was paid to autoantibodies to specifically diagnose systemic lupus erythematosus, and the autoantibodies were identified and verified. Accordingly, autoantibodies specific to systemic lupus erythematosus patients were identified using a protein chip on which a human antigen was dotted, and an SMYD3 protein antigen capable of binding specifically to an SMYD3 autoantibody was produced. The sera of systemic lupus erythematosus patients were analyzed using the produced SMYD3 protein antigen, and as a result, it could be confirmed that the SMYD3 autoantibody was present in larger amounts in the sera of systemic lupus erythematosus patients than in that of a normal group.

Therefore, in one aspect, the present invention is directed to a composition for diagnosing systemic lupus erythematosus, the composition comprising an antigen protein that binds specifically to an SMYD3 autoantibody.

In the present invention, the antigen protein that binds specifically to the SMYD3 autoantibody may be represented by the amino acid sequence of SEQ ID NO: 1. SMYD3 is preferably a sequence set forth in GenBank Accession No. BC031010.

As used herein, the term "autoantibody (AAb)" refers to an antibody that is expressed in vivo and reacts specifically with in vivo components.

In the present invention, the autoantibody may be an autoantibody against the SMYD3 antigen protein, which is produced at the onset of systemic lupus erythematosus.

As used herein, the term "antigen" refers to a proteinaceous immunogen that may cause an antigen-antibody reaction with the antibody. This antigen may be produced by cloning each marker gene into an expression vector according to a conventional method to obtain a protein encoded by the marker gene and producing the antigen from the obtained protein.

The antigen that is used in the present invention may be an antigen that binds specifically to the SMYD3 autoantibody described above.

As used herein, the term "systemic lupus erythematosus (SLE)" used in the present invention refers to a chronic autoimmune disease that causes inflammation in various organs, such as skin, joints, kidneys, lungs or nerves, due to abnormalities in the immune system, which protects the human body from the outside.

In another aspect, the present invention is directed to a kit for diagnosing systemic lupus erythematosus, the kit comprising the composition.

In the present invention, the kit may diagnose systemic lupus erythematosus by detecting the SMYD3 autoantibody in a bodily fluid sample through an antigen-antibody reaction. That is, the kit may diagnose the onset of systemic lupus erythematosus by detecting an autoantibody against SMYD3 in the patient's blood.

As used herein, the term "diagnosis" or "diagnosing" means confirming the presence or feature of a pathology.

In the present invention, the diagnosis may be interpreted as confirming the onset of systemic lupus erythematosus.

The kit of the present invention may be used to diagnose the onset of systemic lupus erythematosus by measuring the level of an autoantibody against SMYD3 from a sample derived from a subject who has developed systemic lupus erythematosus. Although not particularly limited thereto, the kit may also comprise an antigen, an antibody or an aptamer for measuring the level of the protein, as well as one or more other components, compositions, solutions, or devices suitable for the analysis method.

As used herein, the term "sample" refers to a direct object which is isolated from a subject who has developed systemic lupus erythematosus and in which the expression level of an autoantibody against SMYD3 is measured. Preferably, the sample is, but is not limited to, blood, serum or plasma from a patient who has developed systemic lupus erythematosus.

In the present invention, the kit is preferably an enzyme immunoassay (ELISA) kit, a dot blot assay kit or a Western blot assay kit. The kit may comprise a substrate, a suitable buffer solution, a chromogenic enzyme- or fluorophore-labeled secondary antibody, a chromogenic substrate, etc. for immunological detection of the antibody, but is not specifically limited thereto. As the substrate, it is possible to use a nitrocellulose membrane, a 96-well plate synthesized using polyvinyl resin, a 96-well plate synthesized using polystyrene resin, or a slide glass, without particular limitation thereto. As the chromogenic enzyme, it is possible to use peroxidase or alkaline phosphatase, without particular limitation thereto. The fluorophore may be FITC, RITC or the like, but is not specifically limited thereto. The chromogenic substrate may be ABTS (2,2'-azino-bis(3-ethylbenzothiazoline-6-sulfonic acid)) OPD (o-phenylenediamine), or TMB (tetramethyl benzidine), but is not limited thereto.

The kit of the present invention may comprise reagents, such as those necessary for performing negative and positive control reactions, or a buffer required for a hybridization reaction. Optimal amounts of reagents to be used in a given reaction may be readily determined by a person skilled in the art who understands the contents of the present specification. For example, the kit of the present invention may contain the above-described components in separate packages or compartments.

In another example of the present invention, to verify that a large amount of the SMYD3 autoantibody is present in the sera of systemic lupus erythematosus patients, a dot blot assay was performed using purified GST-SMYD3 recombinant protein. As a result, it was confirmed that the SMYD3 autoantibody, which recognizes the SMYD3 autoantigen, was overexpressed in the sera of systemic lupus erythematosus patients compared to the normal group.

Therefore, in still another aspect, the present invention is directed to a method for providing information for diagnosis of systemic lupus erythematosus (SLE), the method comprising steps of: (a) detecting an SMYD3 (SET and MYND domain-containing protein 3) autoantibody in a biological sample isolated from a subject; and (b) comparing the level of the detected SMYD3 autoantibody with a control.

In yet another aspect, the present invention is directed to a method for diagnosing systemic lupus erythematosus (SLE), the method comprising steps of: (a) detecting an SMYD3 (SET and MYND domain-containing protein 3) autoantibody in a biological sample isolated from a subject; and (b) comparing the level of the detected SMYD3 autoantibody with a control.

The method for providing information and the method for diagnosing systemic lupus erythematosus according to the present invention comprise step (a) of detecting an SMYD3 (SET and MYND domain-containing protein 3) autoantibody in a biological sample isolated from a subject.

In the present invention, the biological sample may preferably be blood, serum or plasma, but is not specifically limited thereto.

In the present invention, the term "detecting" refers to a process of detecting and confirming an SMYD3 autoantibody in a biological sample through an antigen-antibody reaction. That is, systemic lupus erythematosus may be diagnosed using an antigenic protein that binds specifically to the SMYD3 autoantibody. Assay methods for this detection include, but are not limited to, Western blotting, ELISA (enzyme-linked immunosorbent assay), radioimmunoassay, radioimmunodiffusion, Ouchterlony immunodiffusion assay, rocket immunoelectrophoresis assay, immunohistostaining assay, immunoprecipitation assay, complete fixation assay, fluorescence-activated cell sorter (FACS), protein chip assay, etc.

The method for providing information and the method for diagnosing systemic lupus erythematosus according to the present invention comprise step (b) of comparing the level of the detected SMYD3 autoantibody with a control.

In the above methods, when the level of the autoantibody against SMYD3, measured in the biological sample, increases by 1.2 times or more compared to the level measured in the biological sample of a normal subject, it may be determined that the subject has developed systemic lupus erythematosus, and when the level of the autoantibody against SMYD3 is less than 1.2 times, it may be determined that the subject has not developed systemic lupus erythematosus. In this case, the method of measuring the level of the autoantibody against SMYD3 is as described above.

EXAMPLES

Hereinafter, the present invention will be described in more detail with reference to examples. It will be obvious to those skilled in the art that these examples are merely to illustrate the present invention, and the scope of the present invention is not limited by these examples.

Figure 1:
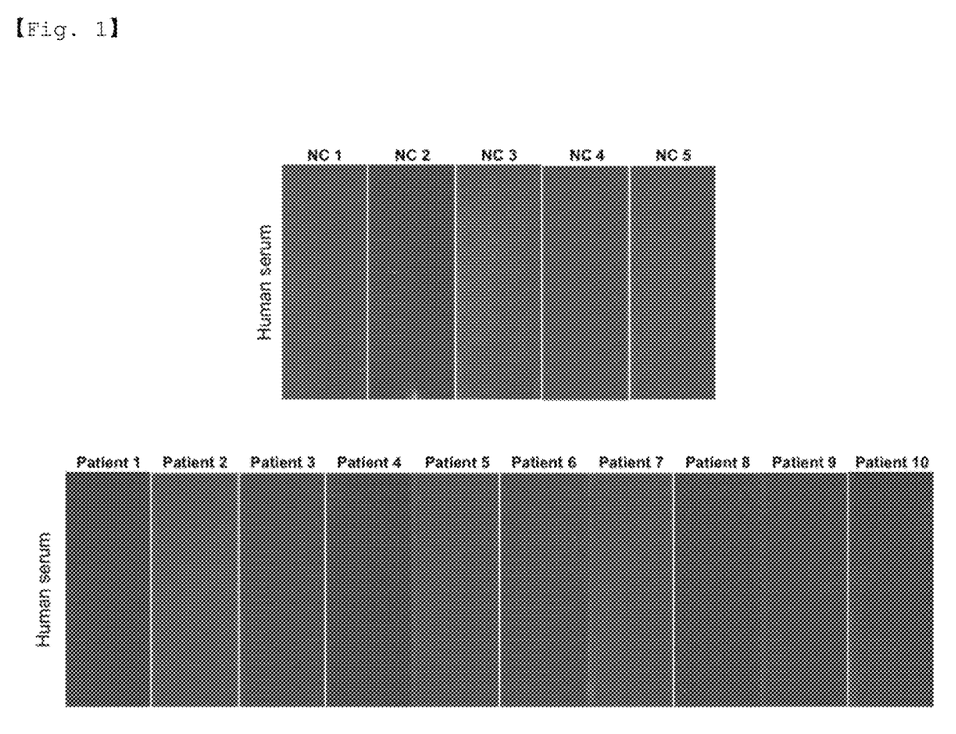
FIG. 1 shows the results of identifying autoantibodies specific for systemic lupus erythematosus using a 22K protein microarray.

Example 1: Identification of Systemic Lupus Erythematosus Antibodies Using 22K Protein Microarray In order to detect systemic lupus erythematosus-specific autoantibodies, an experiment was performed on serum samples from 5 normal persons and 10 systemic lupus erythematosus patients using a protein chip on which 22,000 (22K) human antigens were dotted. As a result, a total of 63 autoantibodies were identified (FIG. 1).

Of these, 29 autoantibodies were common to 4 patients, 10 autoantibodies were common to 5 patients, 7 autoantibodies were common to 6 patients, 6 autoantibodies were common to 7 patients, and 8 autoantibodies were common to 8 patients. In particular, 3 autoantibodies were common to the blood from 9 systemic lupus erythematosus patients.

These biomarkers specific for systemic lupus erythematosus specific biomarkers are shown in Table 1 below.

TABLE 1

| Repetitive detection of frequency of autoantibody | Detected number of autoantibody | The name of auto antigen |
|---|---|---|
| 4 | 29 | ACVR2B, C6orf141, CCDC40, COPE, DBN1, ECE1, ECE2, GAGE10, GCLC, GGA1, KHDC1L, MAGEA1, NUDT16, OTUD5, PAIP2, PGK2, PGM2, PTPN23, RABL2A, R3HDM2, RABL2A, RPLP0, RPLP1, RPLP2, SF3B4, TRIM33, UBQLN3, Zfp185, ZNF71, AAMP |
| 5 | 10 | ABL3, ADD1, AP1B1, DPPA3, GSN, SRRD, STMN4, TBC1D13, UBL7, ZRANB2 |
| 6 | 7 | ANXA6, DTNBP1, LOR, NOL3, PCMTD1, PPA1, XAGE2B |
| 7 | 6 | EYA1, GPHN, IRF2BP2, MARCKSL1, PIK3R2, SPRR3 |
| 8 | 8 | APBB1, LIMD1, SATB1, SH3BP1, SPANXN2, TCP1, TXLNB, ZSCAN20 |
| 9 | 3 | KCTD13, PPP1R12B, SMYD3 |

Example 2: Construction of Systemic Lupus Erythematosus Biomarker Protein Expression Vector An entry vector comprising the entire domain of the systemic lupus erythematosus biomarker candidate SMYD3 was constructed and named pCR8GW-SMYD3.

To produce a pCR8GW-SMYD3 construct, primers were designed based on a full-length SMYD3 DNA sequence (1,287 bp) and were then synthesized by MicroGen (Table 2).

The amino acid sequence (aa 1-428) of full-length SMYD3 is represented by SEQ ID NO: 1. In Table 2 below, the SMYD3 WT forward primer is represented by SEQ ID NO: 2, and the SMYD3 WT reverse primer is represented by SEQ ID NO: 3.

TABLE 2

| SEQ ID NO: | Primer | Sequence (5' → 3') |
|---|---|---|
| 2 | SMYD3 WT Forward primer | ATG GAG CCG CTG AAG GTG GAAAAG TTC |
| 3 | SMYD3 WT Reverse primer | CTA GGA TGC TCT GAT GTT GGG GTC GCA |

Figure 2:
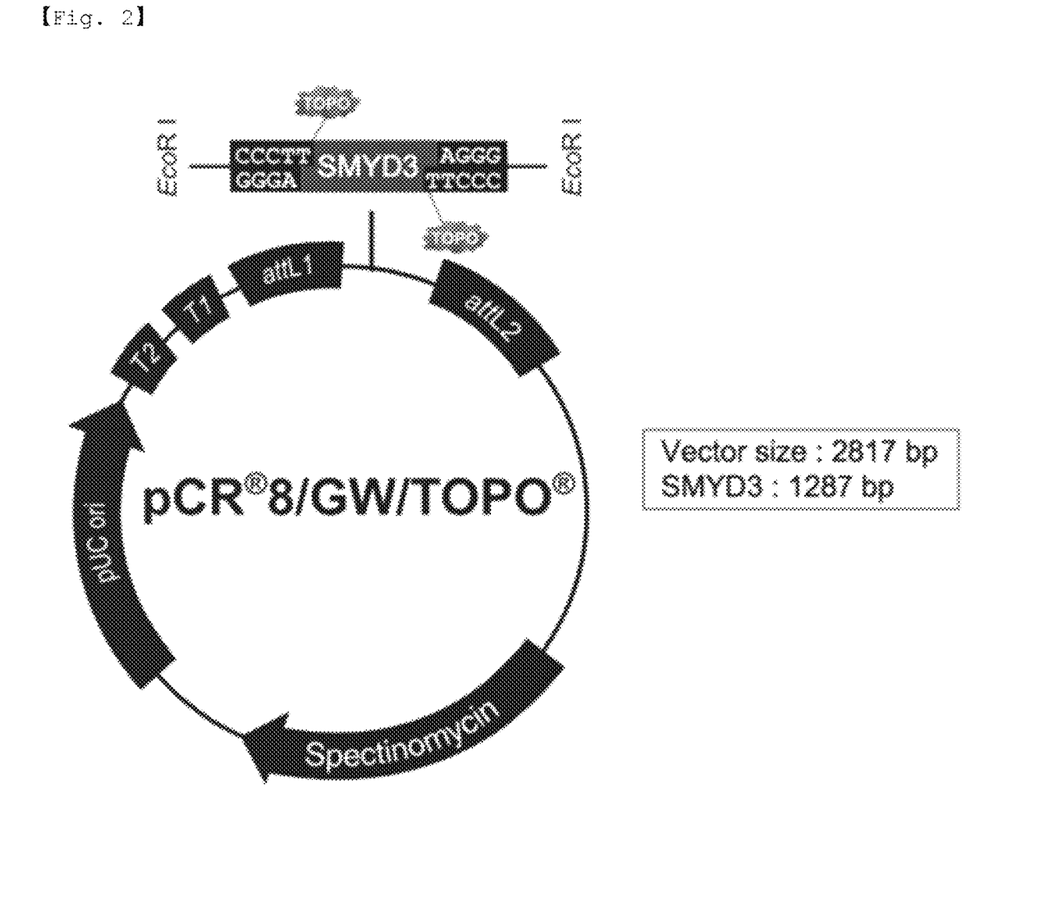
FIG. 2 shows a pCR8GW-SMYD3 vector for constructing an SMYD3 recombinant protein expression vector.
Figure 3:
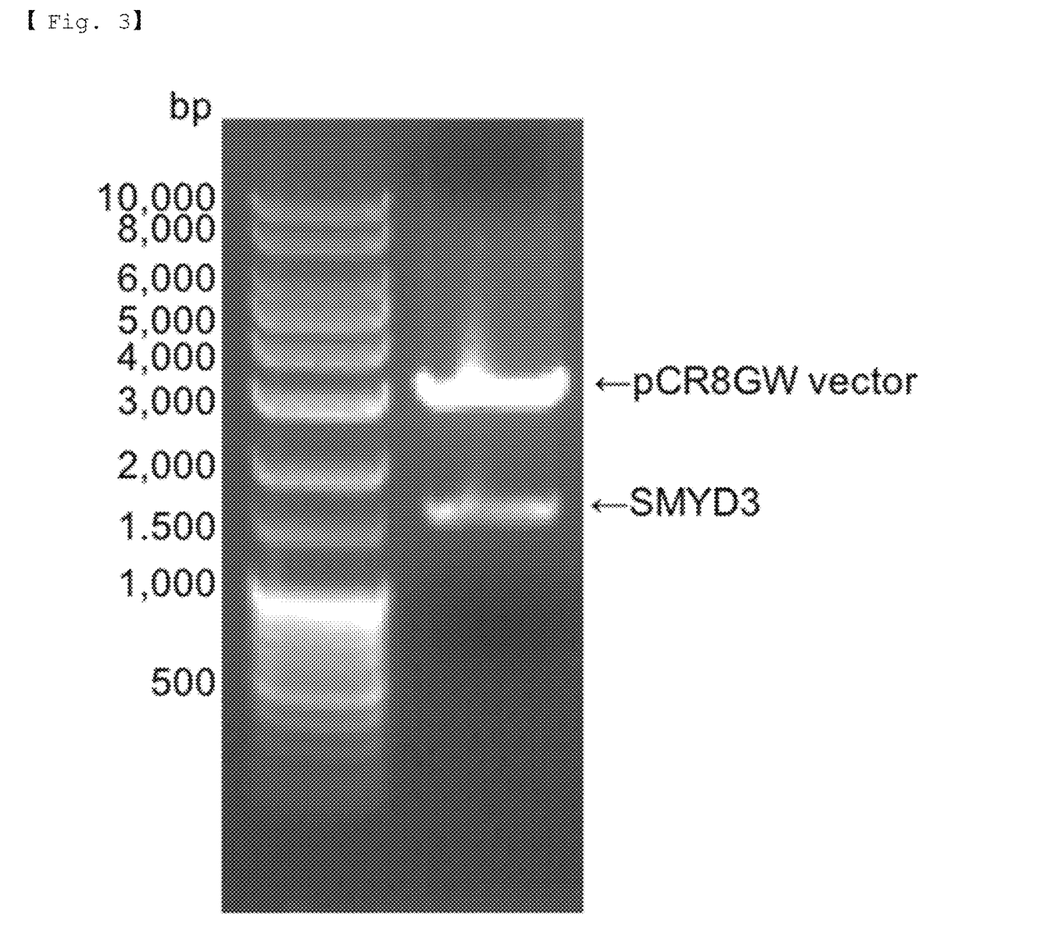
FIG. 3 shows the results of cloning the pCR8GW-SMYD3 vector for constructing the SMYD3 recombinant protein expression vector.

Using human cDNA as a template, PCR was performed using the synthesized primers. The synthesized PCR product was cloned into a pCR8GW vector (FIGS. 2 and 3).

Figure 4:
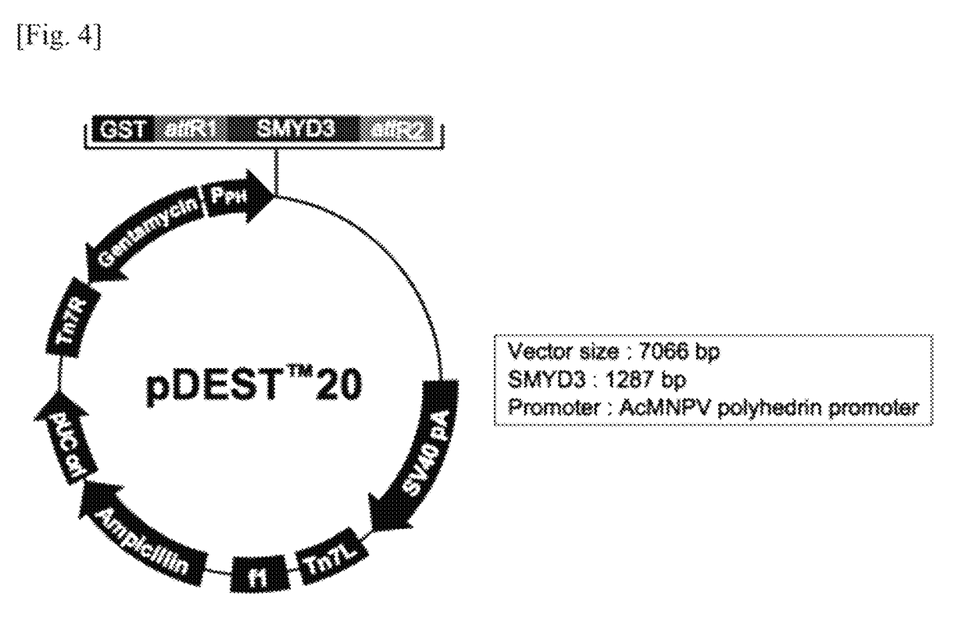
FIG. 4 shows a pDEST20-SMYD3 vector for purifying the SMYD3 recombinant protein.
Figure 5:
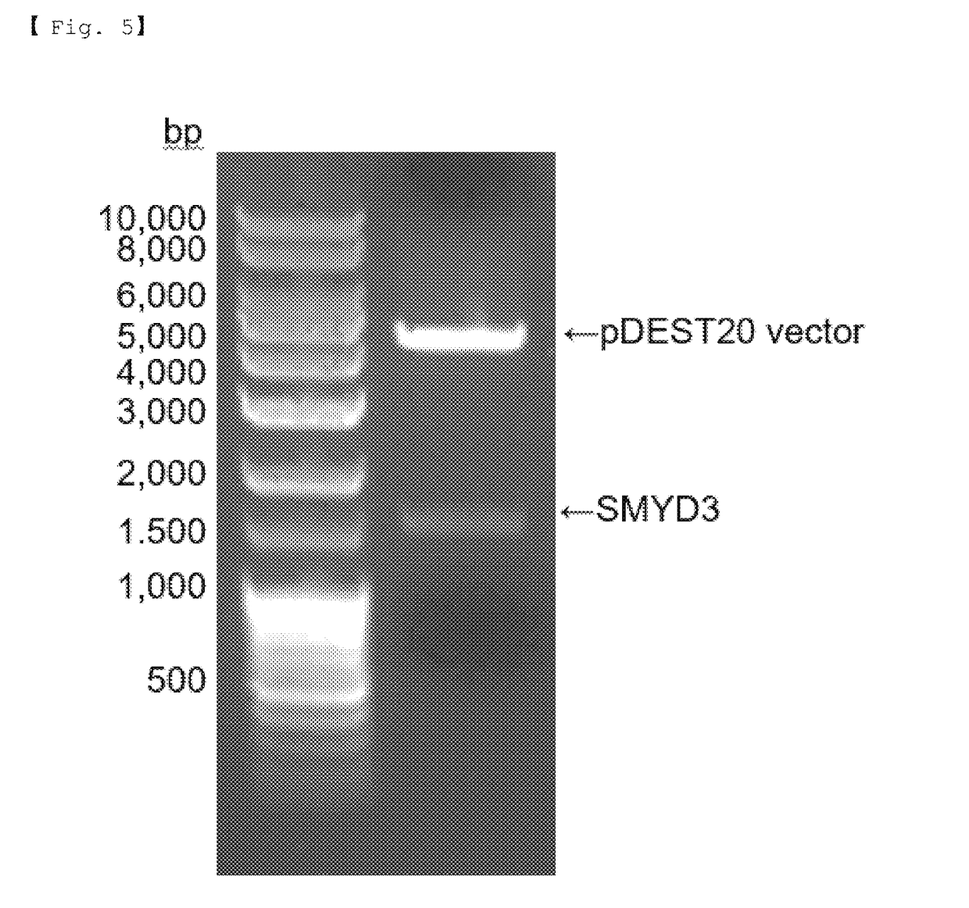
FIG. 5 shows the results of cloning the pDEST20-SMYD3 vector for purifying the SMYD3 recombinant protein.

Thereafter, to conjugate GST-Tag to the N-terminus of SMYD3, a pDEST20-SMYD3 construct was produced by gateway cloning with the constructed vector (FIGS. 4 and 5). Using the vector constructed using the amino acid sequence represented by SEQ ID NO: 1, SMYD3-Bacmid capable of expressing the recombinant protein in insect cells was constructed.

Example 3: Expression of Systemic Lupus Erythematosus Biomarker Protein in Insect Cells SMYD3-Bacmid, constructed for expression of the systemic lupus erythematosus biomarker SMYD3 recombinant protein in Example 2, was transfected into SF9 insect cells. A baculovirus that induces the expression of the SMYD3 recombinant protein in the transfected cells was produced. Expression of the recombinant protein in the cells was confirmed by Western blot (FIG. 6).

Figure 6:
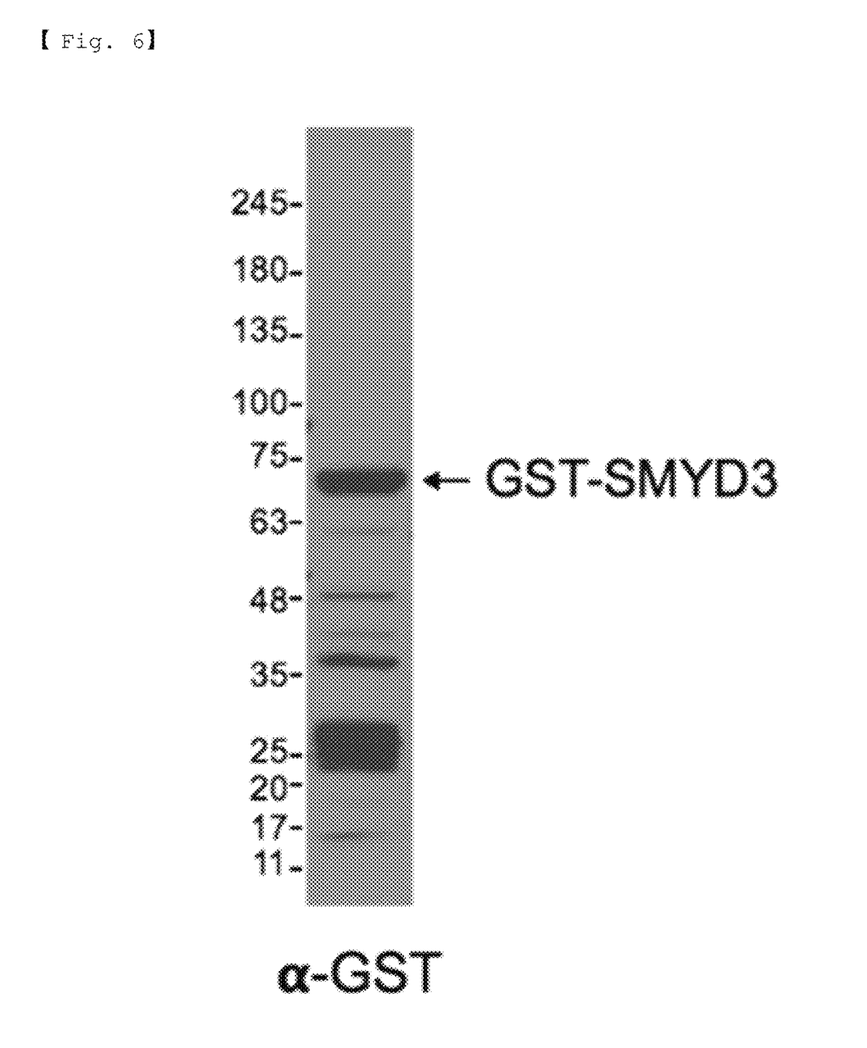
FIG. 6 shows the results of analyzing a GST-SMYD3 recombinant protein.

As a result, as shown in FIG. 6, it could be confirmed that expression of the systemic lupus erythematosus biomarker SMYD3 was induced well.

Example 4: Purification of Systemic Lupus Erythematosus Biomarker

SMYD3 baculovirus, constructed for large-scale purification of the systemic lupus erythematosus biomarker protein, was secondarily infected into SF9 insect host cells. Expression of the SMYD3 recombinant protein was induced so that the SMYD3 recombinant protein could be purified using the GST-tag contained in the produced bacmid.

The SF9 insect cells secondarily infected by the baculovirus were cultured at 28° C. for 3 days. Thereafter, the medium containing the virus was centrifuged at 1,500 rpm and stored at 4° C., and the cells overexpressing the recombinant protein were washed once with PBS to remove residual medium. The cells were recovered by centrifugation at 1,500 rpm for 1 minute, and mixed with 5 ml of cell lysis buffer (25 mM Tris-Cl (pH7.4), 150 mM NaCl, 1 mM EDTA, 1 mM DTT, 1% NP-40, 0.1% Triton X-100, 1 mM PMSF, 1× protease inhibitor cocktail) in each 75T flask, and then incubated at 4° C. for 30 minutes. The lysate was centrifuged at 14,000 rpm for 10 minutes, and only the supernatant was collected. In order to purify only GST-SMYD3 from the aqueous solution, the supernatant was allowed to react with glutathione Sepharose 4B (GE Healthcare Life Science, USA), and then recombinant protein-bound glutathione Sepharose 4B was isolated using a chromatography method. To remove non-specifically bound proteins, the glutathione Sepharose 4B was washed 3 times with cell lysis buffer. Recombinant proteins were eluted from the glutathione Sepharose 4B using a solution (containing 50 mM HEPES, 100 mM NaCl, 30% glycerol and 40 mM GSH, pH 7.5).

Figure 7:
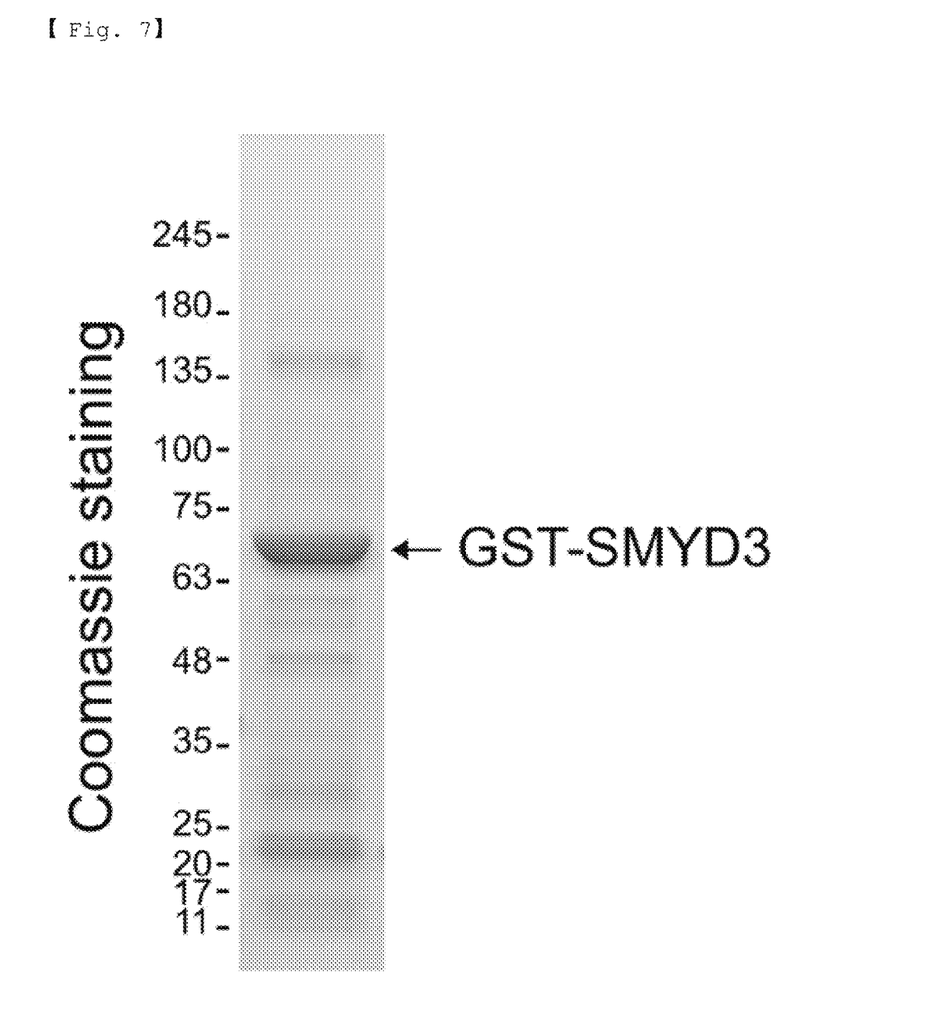
FIG. 7 shows the results of SDS-PAGE analysis of a purified GST-SMYD3 recombinant protein.

As a result of SDS-PAGE analysis, it was confirmed that a GST-SMYD3 recombinant protein having a size of about 70 kDa was purified (FIG. 7).

Example 5: Verification of Autoantibody Specific for Systemic Lupus Erythematosus In order to verify whether a large amount of the new SMYD3 autoantibody identified by the protein microarray technique is present in the sera of systemic lupus erythematosus patients, a dot blot assay was performed using the purified GST-SMYD3 recombinant protein. The dot blot assay was performed by dotting 1 µg of the GST-SMYD3 protein on a nitrocellulose (NC) membrane and allowing the antigen to react with the sera from 50 normal persons and 100 systemic lupus erythematosus patients.

Figure 8:
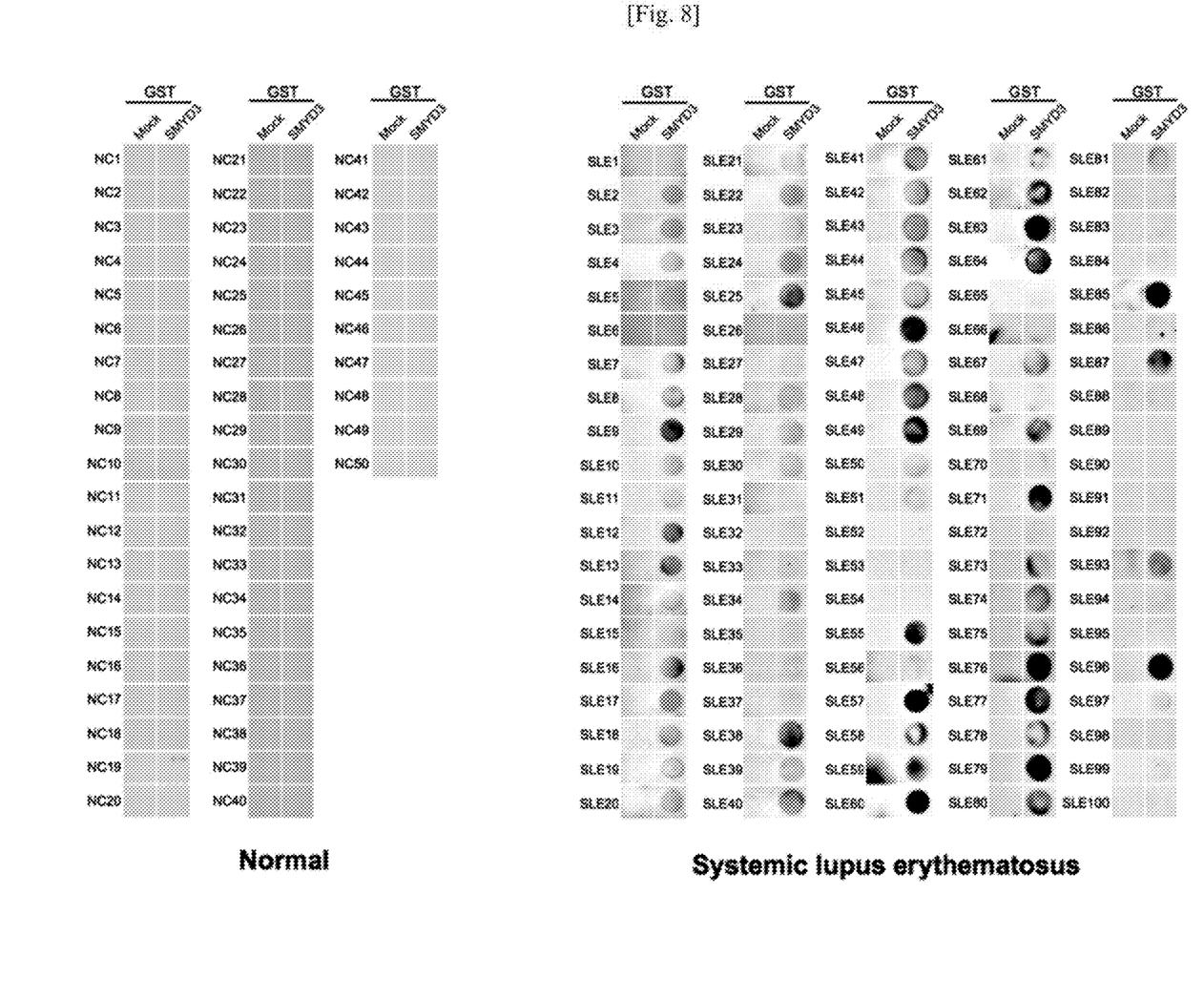
FIG. 8 shows the results of verifying an autoantibody specific for systemic lupus erythematosus using an SMYD3 recombinant protein and systemic lupus erythematosus clinical samples.
Figure 10:
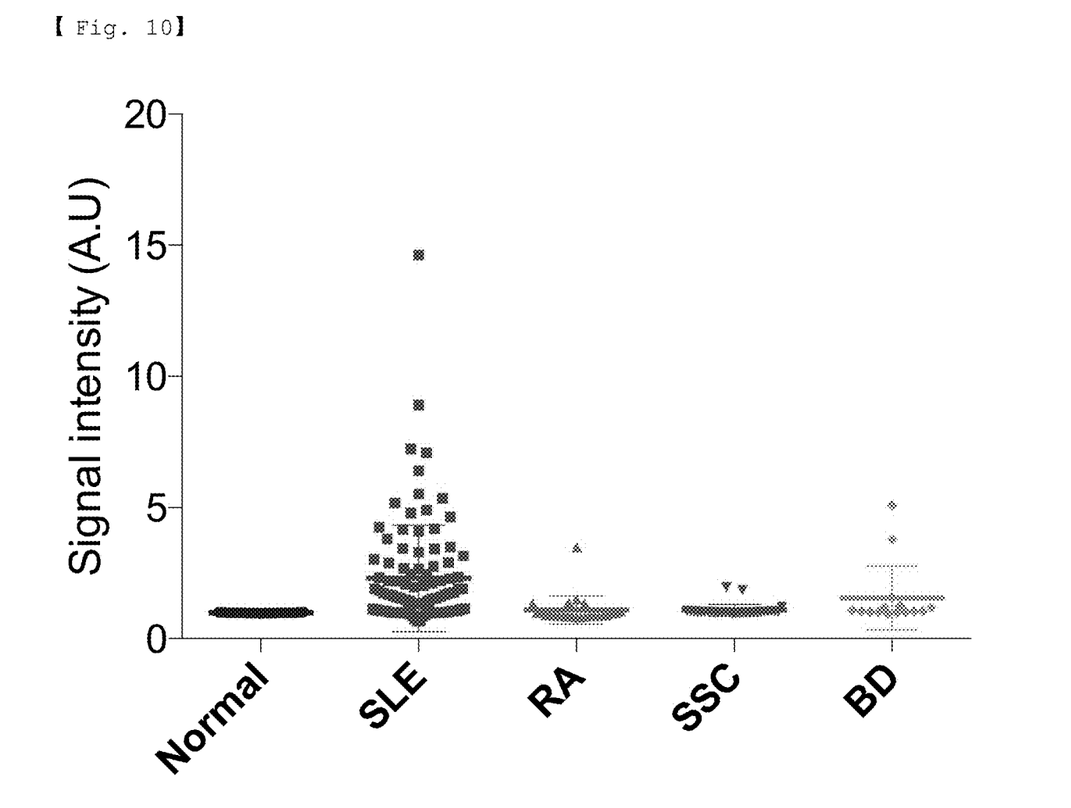
FIG. 10 shows the results of imageJ program analysis performed to verify the results of the dot-blot assay performed to analyze specificity using the SMYD3 recombinant protein and systemic lupus erythematosus clinical samples.

As a result, it was confirmed that the SMYD3 autoantibody recognizing the SMYD3 autoantigen was at least 1.2 times overexpressed in the sera from 68 patients compared to the normal group (FIGS. 8 and 10). Based on these results, which are the same as the protein microarray results, it was verified that the SMYD3 autoantibody was present in larger amounts in the sera from systemic lupus erythematosus patients than in the normal group.

Example 6: Analysis of Specificity of Systemic Lupus Erythematosus Biomarker for Clinical Samples In order to verify whether the SMYD3 autoantibody present in the sera of systemic lupus erythematosus patients is specific for systemic lupus erythematosus, a dot blot assay was performed using the purified GST-SMYD3 recombinant protein. The dot blot assay was performed by dotting 1 µg of the GST-SMYD3 protein on a NC membrane and allowing the antigen to react with each of the sera from 25 rheumatoid arthritis patients, 30 systemic sclerosis patients and 15 Behcet's disease patients.

Figure 9:
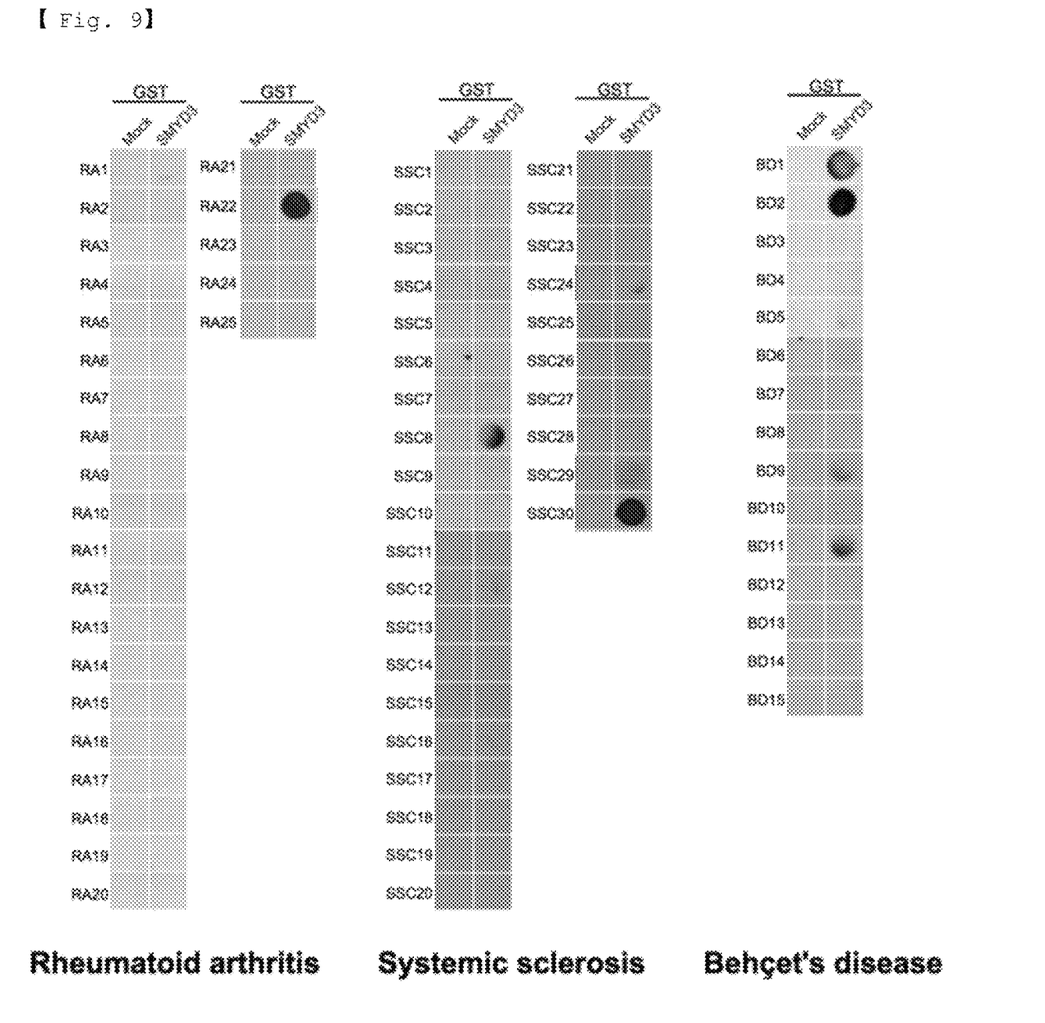
FIG. 9 shows the results of analyzing the specificity of a systemic lupus erythematosus marker using the SMYD3 recombinant protein and systemic lupus erythematosus clinical samples.

As a result, it was confirmed that SMYD3 autoantibody was not detected in 24 rheumatoid arthritis patients, 27 systemic sclerosis patients and 10 Behcet's disease patients (FIG. 9). That is, it was verified that the SMYD3 autoantibody present in the sera from the patients was specific for systemic lupus erythematosus.

The results of the dot blot assay performed in Examples 5 and 6 were analyzed using the imageJ program and then displayed as a graph (FIG. 10).

INDUSTRIAL APPLICABILITY

The method of diagnosing systemic lupus erythematosus using an antigen protein that binds specifically to the SMYD3 autoantibody according to the present invention uses a non-invasive biological sample such as blood, and thus may diagnose systemic lupus erythematosus very conveniently without burdening the patient, unlike conventional methods. In addition, the method has high specificity and sensitivity, and thus may be effectively used for early diagnosis of systemic lupus erythematosus.

Although the present invention has been described in detail with reference to specific features, it will be apparent to those skilled in the art that this description is only of a preferred embodiment thereof, and does not limit the scope of the present invention. Thus, the substantial scope of the present invention will be defined by the appended claims and equivalents thereto.

Sequence List Free Text

An electronic file is attached.

The invention claimed is:

1. A method for providing information for diagnosis of systemic lupus erythematosus (SLE), comprising:
   (a) detecting an SMYD3 (SET and MYND domain-containing protein 3) autoantibody in a biological sample isolated from each of a subject and a normal group without SLE by treating the biological sample with an antigen protein that binds specifically to the SMYD3 autoantibody; and
   (b) determining that the subject has developed systemic lupus erythematosus when the level of the SMYD3 autoantibody increases by 1.2 times or more compared to that of the normal group,
   wherein the antigen protein comprises the amino acid sequence of SEQ ID NO: 1.

2. The method of claim 1, wherein the biological sample is blood, serum or plasma.

3. A method for diagnosing systemic lupus erythematosus (SLE), comprising:
   (a) detecting an SMYD3 (SET and MYND domain-containing protein 3) autoantibody in a biological sample isolated from each of a subject and a normal group without SLE by treating the biological sample with an antigen protein that binds specifically to the SMYD3 autoantibody; and
   (b) determining that the subject has developed systemic lupus erythematosus when the level of the SMYD3 autoantibody increases by 1.2 times or more compared to that of the normal group,
   wherein the antigen protein comprises the amino acid sequence of SEQ ID NO: 1.

4. The method of claim 3, wherein the biological sample is blood, serum or plasma.

* * * * *